United States Patent
Shi

(10) Patent No.: US 8,672,631 B2
(45) Date of Patent: Mar. 18, 2014

(54) ARTICULATED WIND TURBINE BLADES

(75) Inventor: Jun Shi, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 797 days.

(21) Appl. No.: 12/872,003

(22) Filed: Aug. 31, 2010

(65) Prior Publication Data

US 2012/0051912 A1 Mar. 1, 2012

(51) Int. Cl.
  *F03D 1/02* (2006.01)
(52) U.S. Cl.
  USPC .................... 416/132 B; 416/210 R; 416/233
(58) Field of Classification Search
  USPC ...... 416/131, 132 R, 132 B, 142, 143, 196 R, 416/204 R, 205, 170 R, 210 R, 155, 232, 416/233, DIG. 4
  See application file for complete search history.

(56) References Cited

U.S. PATENT DOCUMENTS

| | | | |
|---|---|---|---|
| 4,335,996 A * | 6/1982 | Ross | 416/88 |
| 4,352,634 A | 10/1982 | Andrews | |
| 4,423,333 A | 12/1983 | Rossman | |
| 4,533,297 A * | 8/1985 | Bassett | 416/132 B |
| 4,632,637 A | 12/1986 | Traudt | |
| 4,718,821 A | 1/1988 | Clancy | |
| 4,735,552 A * | 4/1988 | Watson | 416/99 |
| 5,193,978 A | 3/1993 | Gutierrez | |
| 6,069,409 A | 5/2000 | Fowler et al. | |
| 6,327,957 B1 | 12/2001 | Carter, Sr. | |
| 6,769,873 B2 | 8/2004 | Beauchamp et al. | |
| 7,186,086 B2 | 3/2007 | Yoshida | |
| 7,323,792 B2 | 1/2008 | Sohn | |
| 7,393,184 B2 | 7/2008 | Cairo | |
| 7,425,774 B2 | 9/2008 | Shibata et al. | |
| 7,581,926 B1 | 9/2009 | Dehlsen et al. | |
| 7,632,070 B2 | 12/2009 | Dawson et al. | |
| 7,766,602 B1 | 8/2010 | Stroburg | |
| 8,029,241 B2 * | 10/2011 | McGrath et al. | 416/228 |
| 2008/0124216 A1 | 5/2008 | Liao | |
| 2010/0135797 A1 | 6/2010 | Nies | |

FOREIGN PATENT DOCUMENTS

| | | |
|---|---|---|
| EP | 2157315 | 2/2010 |
| WO | 2009084992 | 7/2009 |

* cited by examiner

*Primary Examiner* — Nathaniel Wiehe
*Assistant Examiner* — Woody A Lee, Jr.
(74) *Attorney, Agent, or Firm* — Kinney & Lange, P.A.

(57) ABSTRACT

A blade assembly for a wind turbine has a hub, a plurality of inboard and outboard blades, and a plurality of cables. The inboard blades are spaced apart from one another and are mounted on the hub. Each outboard blade is pivotally connected to one of the inboard blades such that it is capable of rotation to a desired swept angle relative to the inboard blade to which it is connected. The cables extend between the outboard blades and the inboard blades to actuate rotation of the outboard blades to the desired swept angle.

17 Claims, 5 Drawing Sheets

Figure 1A:
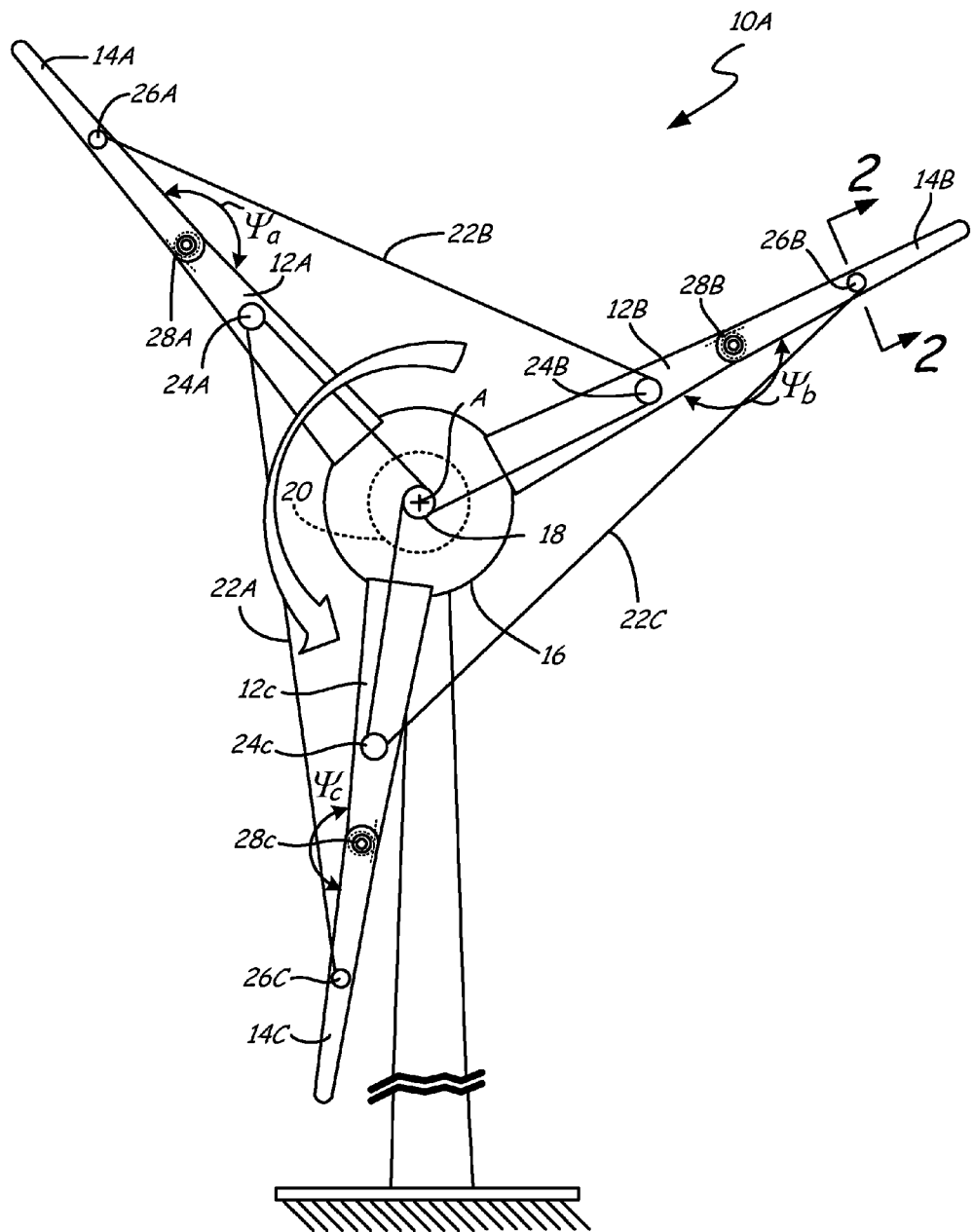
Figure 1B:
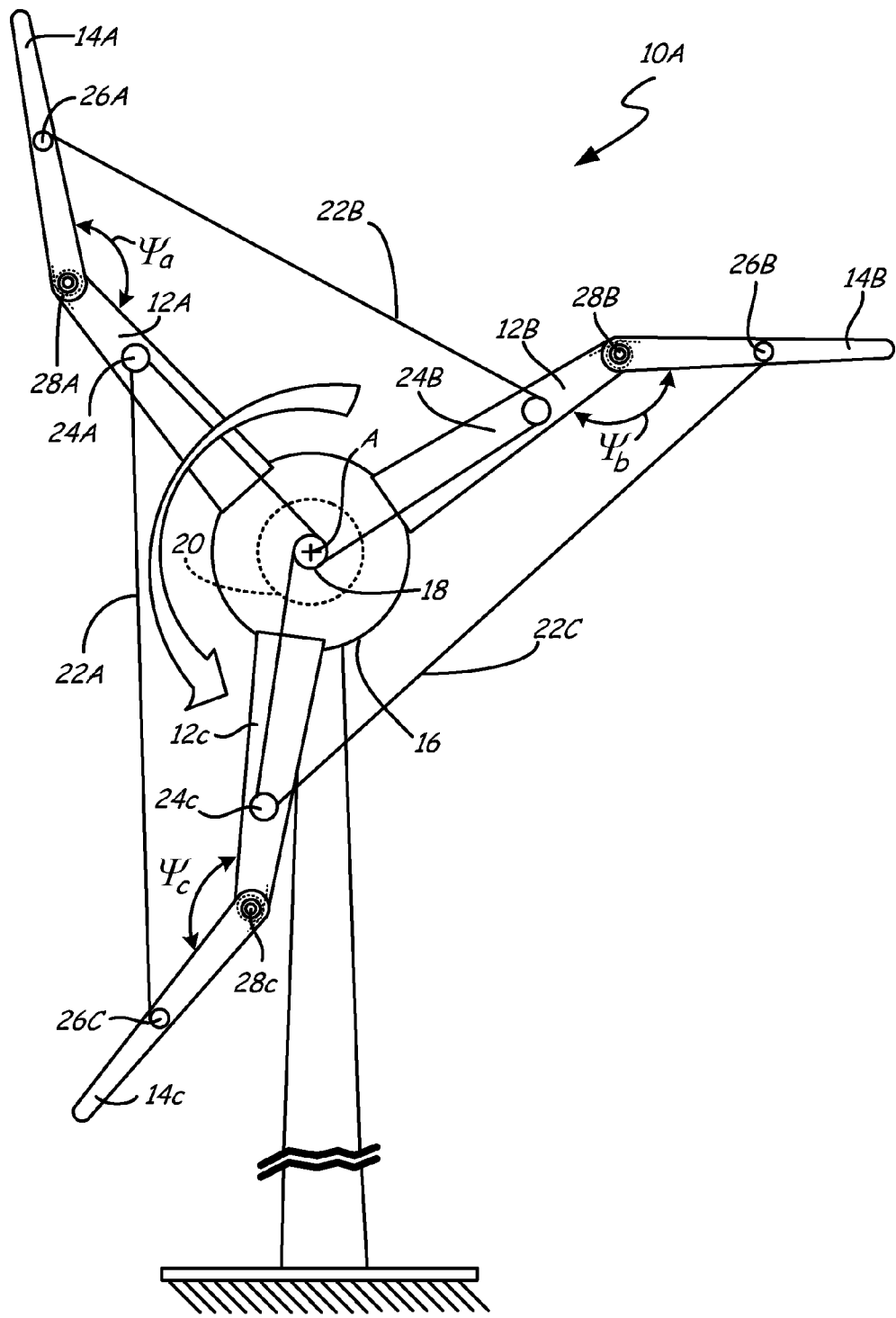

ARTICULATED WIND TURBINE BLADES

BACKGROUND

The invention relates to wind turbines, and in particular, to wind turbines with articulated blades.

With the diminishing global supply of fossil fuel, renewable sources of energy such as power generated from wind turbines is gaining an increasing share of the electric power market. Thus, generating electrical power more efficiently with wind turbines has become increasingly important to lowering the overall cost of electricity.

It is known that the conversion efficiency of wind generated kinetic energy to electric power is proportional to the square of the length of the blades of a wind turbine. Thus, increasing the length of the blades allows the wind turbine to produce power more efficiently. Lengthy blades currently face three major challenges that have negatively impacted their implementation on wind turbines. First, lengthy blades (current blades can have a length of up to about 50 meters, future blade lengths of up to 80 meters have been contemplated) can be difficult to transport and install. Special large trucks are needed to transport the blades from the manufacturing site along routes to an on-shore implementation site. The routes must be carefully planned so as to accommodate the large trucks and cargo. Specially designed tall cranes may also be required to hoist the blades to the wind turbine tower for installation. In view of these and other challenges, transportation/installation cost can be as high as one third of the manufacturing cost of the blades.

Lengthy blades also have high velocity gradients from the root of the blade to the tip of the blade. High velocity gradients complicate the engineering and fabrication of the wind turbine and blades. For instance, blades (especially those with high velocity gradients) must be designed with a degree of twist (commonly called pitch) from root to tip so as to optimize performance of the blade for a most common wind velocity expected to be experienced at the installation site. Adding twist to blades adds to the complexity of their manufacturing and their cost. Once installed, the twist of the blade commonly remains fixed such that if the wind blows with an unpredicted (non-optimized) speed the conversion efficiency of the wind turbine is reduced.

Additionally, wind turbines utilizing lengthy blades must be shut down during periods of high wind so as to avoid damaging wind turbine parts such as the blades, bearings, gears and support tower. In contrast, wind turbines that utilize shorter blades can operate in higher wind conditions without having to be shut down.

Lengthy blades commonly have a low bending stiffness which can negatively impact the wind turbine conversion efficiency and wind turbine operating life through blade deformation and changes to the natural frequency of the blade. Measures such as extra material reinforcement may be required to reduce blade deformation and changes in the natural frequency of the blade. However, these measures increase the manufacturing cost and weight of the blade.

SUMMARY

A blade assembly for a wind turbine has a hub, a plurality of inboard and outboard blades, and a plurality of cables. The inboard blades are spaced apart from one another and are mounted on the hub. Each outboard blade is pivotally connected to one of the inboard blades such that it is capable of rotation to a desired swept angle relative to the inboard blade to which it is connected. The cables extend between the outboard blades and the inboard blades to actuate rotation of the outboard blades to the desired swept angle.

BRIEF DESCRIPTION OF THE DRAWINGS

FIG. 1A is a schematic view of a first embodiment of a wind turbine having articulated inboard blades and outboard blades with the outboard blades disposed in a first fully extended position.

FIG. 1B is a schematic view of the wind turbine from FIG. 1A with the outboard blades pivoted to a second position.

FIG. 2 is a sectional view through one of the outboard blades of the wind turbine from FIGS. 1A and 1B illustrating the connection between the outboard blade and a first cable.

FIG. 3A is a schematic view of another embodiment of the wind turbine having articulated inboard blades and outboard blades with the outboard blades disposed in a first fully extended position.

FIG. 3B a schematic view of the wind turbine from FIG. 3A with the outboard blades pivoted to a second position.

FIG. 4 is a sectional view through one of the outboard blades of the wind turbine from FIGS. 3A and 3B illustrating the connection between the outboard blade and a first cable and a second cable.

DETAILED DESCRIPTION

As illustrated in FIGS. 1A and 1B, the present invention describes a wind turbine 10A with a plurality of articulated blades comprising inboard blades 12A, 12B, and 12C and outboard blades 14A, 14B, and 14C. Wind turbine 10A includes a hub 16, a winch 18, a drive device 20, and cables 22A, 22B, and 22C. Inboard blades 12A, 12B, and 12C include pulleys 24A, 24B, and 24C. Outboard blades 14A, 14B, and 14C includes elbows 26A, 26B, and 26C, and each outboard blade 14A, 14B, and 14C is biased into a first fully extended position illustrated in FIG. 1A by spring loaded hinges 28A, 28B, and 28C.

Outboard blades 14A, 14B, and 14C are pivotally connected to inboard blades 12A, 12B, and 12C. Thus, each outboard blade 14A, 14B, and 14C can be rotated to a swept angle $\Psi_a$, $\Psi_b$, and $\Psi_c$ relative to inboard blade 12A, 12B, and 12C to which it is connected. Inboard blades 12A, 12B, and 12C spaced apart (in the embodiment shown at 120° intervals from one another) and are fixidly mounted on hub 16 of wind turbine 10A. Inboard blades 12A, 12B, and 12C extend outward from hub 16 to the pivot connections with outboard blades 14A, 14B, and 14C. As illustrated in FIGS. 1A and 1B, outboard blades 14A, 14B, and 14C pivot around axes that can be aligned with but are spaced apart from an axis A rotation of hub 16.

Hub 16 houses components such as the generator(s) and drive device 20 (illustrated in phantom) such as the gearbox for wind turbine 10A. Drive device 20 can also be a device such as an electric motor that is solely dedicated to rotating outboard blades 14A, 14B, and 14C to desired swept angle $\Psi_a$, $\Psi_b$, and $\Psi_c$ that conditions dictate. Drive device 20 is connected to rotate winch 18 (or similar device) that is also disposed in hub 16.

Cables 22A, 22B, and 22C can comprise high strength nylon or steel cable or wire rope or similar linkage. Cables 22A, 22B, and 22C wrap around winch 18 and extend therefrom to pulleys 24A, 24B, and 24C mounted within or on a structural portion of inboard blades 12A, 12B, and 12C. Thus, cables 22A, 22B, and 22C can extend from hub 16 either underneath or outside of the skin of inboard blades 12A, 12B, and 12C. From pulleys 24A, 24B, and 24C cables 22A, 22B, and 22C extend to connect to elbows 26A, 26B, and 26C of the preceding (as defined by direction of rotation of hub 16) outboard blades 14A, 14B, and 14C. For example, with wind turbine 10A undergoing counterclockwise rotation as shown in FIGS. 1A and 1B, cable 22B connects to elbow 26A of the preceding outboard blade 14A and extends to pulley 24B mounted on/in receding inboard blade 12B. From pulley 24B, cable 22B extends along inboard blade 12B into hub 16 to wrap around winch 18.

In the embodiment shown in FIGS. 1A and 1B, the pivot connections between outboard blades 14A, 14B, and 14C and inboard blades 12A, 12B, and 12C have spring loaded hinges 28A, 28B, and 28C disposed adjacent thereto. Spring loaded hinges 28A, 28B, and 28C are capable of biasing outboard blades 14A, 14B, and 14C into the fully extended position with maximum blade sweep illustrated in FIG. 1A.

The pivotal arrangement of the blades of wind turbine 10A allows each outboard blade 14A, 14B, and 14C to vary its swept angle $\Psi_a$, $\Psi_b$, and $\Psi_c$ relative to outboard blade 14A, 14B, and 14C to which it is connected. By varying swept angles $\Psi_a$, $\Psi_b$, and $\Psi_a$, wind turbine 10A can vary the sweep of blades 12A-12C and 14A-14C without changing the overall length of blades 12A-12C and 14A-14C. By varying swept angle $\Psi_a$, $\Psi_b$, and $\Psi_c$ as desired, conversion efficiency for wind turbine 10A can be optimized in view of wind conditions, drag, and other forces at the installation site.

To vary swept angles $\Psi_a$, $\Psi_b$, and $\Psi_a$, outboard blades 14A, 14B, and 14C are actuated to pivot relative to inboard blades 12A, 12B, and 12C by cables 22A, 22B, and 22C. Cables 22A, 22B, and 22C are tightened or loosened to a desired tension by winding/unwinding rotation of winch 18 which is driven by drive device 20. The tension force (or lack thereof) of cables 22A, 22B, and 22C along with inertia and drag forces counter the bias force of hinges 28A, 28B, and 28C to move each outboard blade 14A, 14B, and 14C to desired swept angles $\Psi_a$, $\Psi_b$, and $\Psi_a$. For example, if tension on cables 22A, 22B, and 22C is reduced or released, this allows the bias force of hinges 28A, 28B, and 28C to return outboard blades 14A, 14B, and 14C into the fully extended position with maximum blade sweep illustrated in FIG. 1A. If tension on cables 22A, 22B, and 22C is increased above the bias force exerted by hinges 28A, 28B, and 28C, outboard blades 14A, 14B, and 14C will rotate to a position such as the one shown in FIG. 1B.

In instances of low wind conditions such as those illustrated in FIG. 1A, outboard blades 14A, 14B, and 14C could be fully extended to the fully extend position with maximum blade sweep to achieve maximum conversion efficiency. In the fully extended position, each swept angle $\Psi_a$, $\Psi_b$, and $\Psi_c$ extends substantially 180° between corresponding inboard blades 12A, 12B, and 12C and outboard blades 14A, 14B, and 14C. In instances of high wind conditions such as those illustrated in FIG. 1B, outboard blades 14A, 14B, and 14C are pivoted to desired swept angle $\Psi_a$, $\Psi_b$, and $\Psi_c$ that is less than 180° with respect to corresponding connected inboard blades 12A, 12B, and 12C. Such an arrangement could keep wind turbine 10A from having to shut down in higher wind conditions by reducing drag and other forces on wind turbine 10A.

Wind turbine 10A would also benefit from reduced transportation and installation costs as each blade assembly comprising inboard blades 12A, 12B, and 12C and outboard blades 14A, 14B, and 14C could be shipped and installed with reduced need for special trucks, routes, and cranes as each blade individually would have a reduced length (until assembled) when compared with similar conventional wind turbine blade designs having a similar operational blade sweep.

Additionally, cables 22A, 22B, and 22C would act to stabilize and stiffen inboard blades 12A, 12B, and 12C and outboard blades 14A, 14B, and 14C without adding a great deal of additional weight to those structures. Thus, wind turbine 10A would benefit from improved bending stiffness thereby reducing the likelihood of blade deformation and changes to the natural frequency of blades 12A-12C and 14A-14C.

Figure 2:
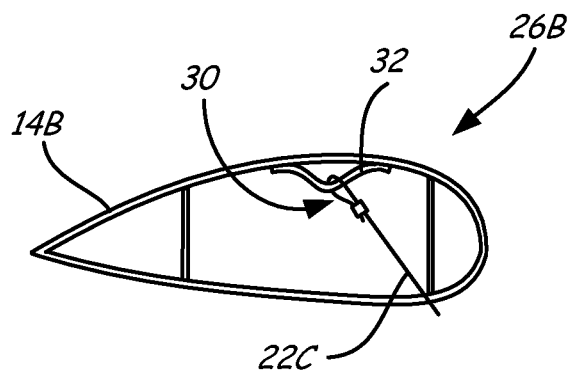

FIG. 2 shows a sectional view of elbow 26B of outboard blade 14B from FIG. 1A. Cable 22C terminates at elbow 26B using conventional means such as a loop 30 to connect it to outboard blade 14B. Other conventional means and methods of cable/wire termination/connection can include swagging, clamping, clipping, splicing, hooks, eyes, threaded rods, studs, forks or the equivalent. Loop 30 attaches cable 22C to hook 32. A hook 32, or suitable alternative, is attached to a structural member within outboard blade 14B.

Figure 3A:
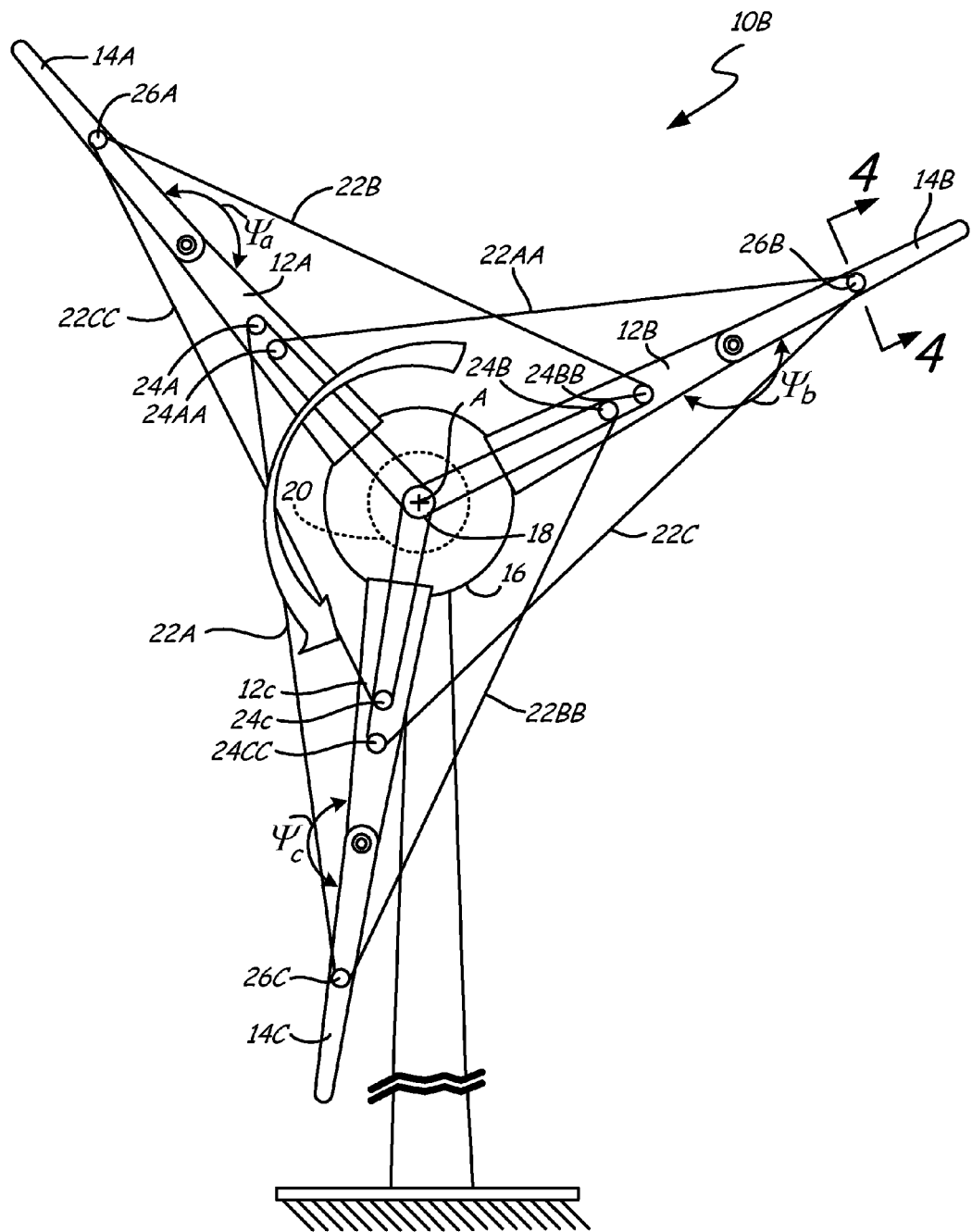
Figure 3B:
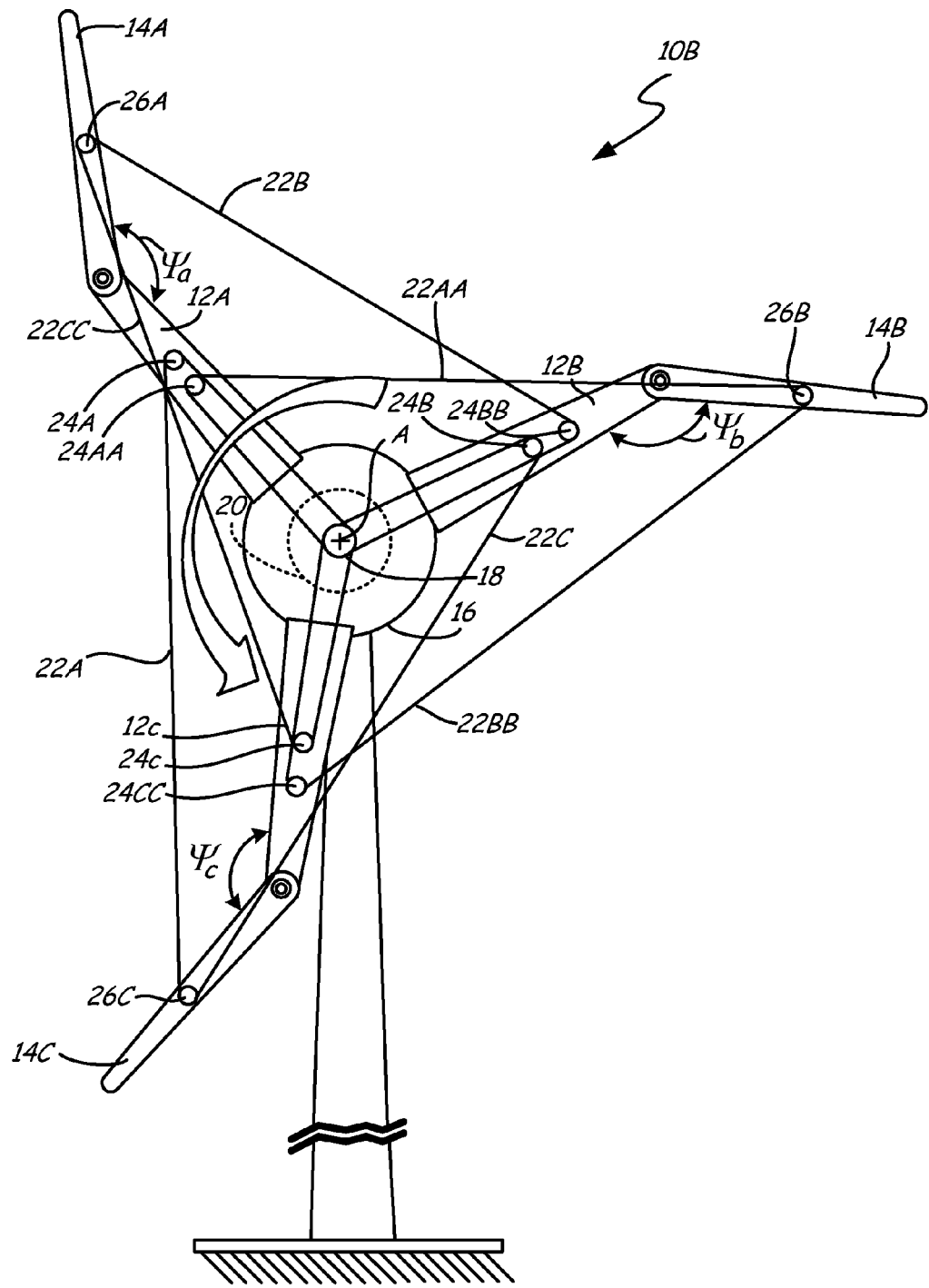

FIGS. 3A and 3B show another embodiment of wind turbine 10B. In most respects wind turbine 10B operates in the same manner as and has identical components to wind turbine 10A. However, wind turbine 10B includes extender cables 22AA, 22BB, and 22CC in addition to cables 22A, 22B, and 22C, and pulleys 24AA, 24BB, and 24CC in addition to pulleys 24A, 24B, and 24C.

Similar to wind turbine 10A, wind turbine 10B has outboard blades 14A, 14B, and 14C that are pivotally connected to inboard blades 12A, 12B, and 12C. Inboard blades 12A, 12B, and 12C are spaced apart (in the embodiment shown at 120° intervals from one another) and are fixidly mounted on hub 16 of wind turbine 10B. Inboard blades 12A, 12B, and 12C extend outward from hub 16 to the pivot connections with outboard blades 14A, 14B, and 14C. Each outboard blade 14A, 14B, and 14C can be rotated to swept angle $\Psi_a$, $\Psi_b$, and $\Psi_c$ relative to inboard blade 12A, 12B, and 12C to which it is connected.

However, inboard blades 12A, 12B, and 12C have additional pulleys 24AA, 24BB, and 24CC mounted within or on a structural portion thereof. Cables 22AA, 22BB, and 22CC wrap around winch 18 in the opposite direction as cables 22A, 22B, and 22C. From winch 18 cables 22AA, 22BB, and 22CC run to pulleys 24AA, 24BB, and 24CC. Similar to cables 22A, 22B, and 22C, cables 22AA, 22BB, and 22CC can extend from hub 16 either underneath or outside of the skin of inboard blades 12A, 12B, and 12C. However, from pulleys 24AA, 24BB, and 24CC cables 22AA, 22BB, and 22CC extend in a direction that differs from cables 22A, 22B, and 22C. This direction allows cables 22AA, 22BB, and 22CC to connect to elbows 26A, 26B, and 26C of the receding (as defined by direction of rotation of hub 16) outboard blades 14A, 14B, and 14C. Thus, with wind turbine 10B undergoing counterclockwise rotation as shown in FIGS. 3A and 3B, cable 22B connects to elbow 26A of the preceding outboard blade 14A and runs to pulley 24B mounted on/in receding inboard blade 12B and cable 22BB connects to elbow 26C of the receding outboard blade 14C and extends to pulley 24BB. From pulley 24BB, cable 22BB extends along inboard blade 12B into hub 16 to wrap around winch 18 in direction opposite that of cable 22B.

In the embodiment shown in FIGS. 3A and 3B, outboard blades 14A, 14B, and 14C are pivoted relative to inboard blades 12A, 12B, and 12C by cables 22A, 22B, 22C, 22AA, 22BB, and 22CC. Hinges 28A, 28B, and 28C used with wind turbine 10A are eliminated from wind turbine 10B.

To extend outboard blades 14A, 14B, and 14C into the fully extended position with maximum blade sweep illustrated in FIG. 3A, outboard blades 14A, 14B, and 14C are actuated to pivot relative to inboard blades 12A, 12B, and 12C by extender cables 22AA, 22BB, and 22CC. In particular, cables 22AA, 22BB, and 22CC are tightened to a desired tension by winding rotation of winch 18 which is driven by drive device 20. This winding rotation acts to extend outboard blades 14A, 14B, and 14C by increasing swept angle $\Psi_a$, $\Psi_b$, and $\Psi_c$ up to substantially 180°. Indeed, winding rotation of cables 22AA, 22BB, and 22CC can increase swept angle $\Psi_a$, $\Psi_b$, and $\Psi_c$ to exceed 180° in some embodiments. The cables 22AA, 22BB, and 22CC act to extend outboard blades 14A, 14B, and 14C (increase swept angle $\Psi_a$, $\Psi_b$, and $\Psi_a$) because the tension force of cables 22AA, 22BB, and 22CC overcomes the force of cables 22A, 22B, and 22C (and inertia and drag forces) to move each outboard blade 14A, 14B, and 14C.

To vary swept angles $\Psi_a$, $\Psi_b$, and $\Psi_c$ from the fully extended position shown in FIG. 3A, outboard blades 14A, 14B, and 14C are pivoted by cables 22A, 22B, and 22C. Cables 22A, 22B, and 22C are tensioned by winding winch 18. This winding also unwinds (decreases tension on) cables 22AA, 22BB, and 22CC. Eventually, the tension force of cables 22A, 22B, and 22C along with inertia and drag forces overcome the force exerted by cables 22AA, 22BB, and 22CC to move each outboard blade 14A, 14B, and 14C to desired swept angles $\Psi_a$, $\Psi_b$, and $\Psi_C$.

Figure 4:
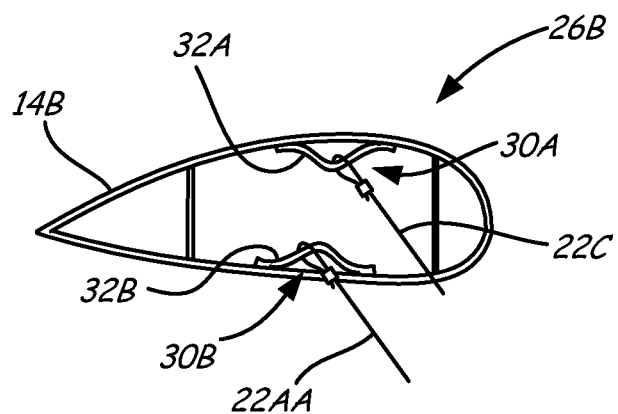

FIG. 4 shows a sectional view of elbow 26B of outboard blade 14B from FIG. 3A. Cables 22C and 22AA terminate at elbow 26B with conventional means such as loops 30A and 30B used to connect cables 22C and 22AA to outboard blade 14B. In other embodiments, cables 22A, 22B, and 22C can terminate at an elbow location that differs from that of the termination points of cables 22AA, 22BB, and 22CC. Other conventional means and methods of cable/wire termination and connection can include swagging, clamping, clipping, splicing, hooks, eyes, threaded rods, studs, forks or the equivalent. Loops 30A and 30B attach cables 22C and 22AA to hooks 32A and 32B, respectively. Hooks 32A and 32B, or suitable alternative, are attached to a structural member on or within outboard blade 14B.

While the invention has been described with reference to an exemplary embodiment(s), it will be understood by those skilled in the art that various changes may be made and equivalents may be substituted for elements thereof without departing from the scope of the invention. For example, while blade assemblies comprising inboard and outboard articulated blades are specifically described it is recognized that a blade assembly of three or more blades comprising inboard, middle, and outboard blades, are contemplated in other embodiments. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wind turbine comprising:
   a hub;
   a first inboard blade and a second inboard blade, the first inboard blade and second inboard blade spaced apart and mounted on the hub of the wind turbine;
   a first outboard blade pivotally connected to the first inboard blade and a second outboard blade pivotally connected to the second inboard blade; and
   a first cable extending between the first outboard blade and the second inboard blade, and connected to a pulley disposed on or within the second inboard blade.

2. The wind turbine of claim 1, wherein the first cable actuates rotation of the first outboard blade to a desired swept angle relative to the first inboard blade.

3. The wind turbine of claim 1, further comprising:
   a third outboard blade pivotally connected to a third inboard blade, the third inboard blade mounted to the hub and spaced apart from the first and second inboard blades; and
   at least two cables in addition to the first cable, the at least two cables including a second cable extending between the second outboard blade and the third inboard blade and a third cable extending between the third outboard blade and the first inboard blade.

4. The wind turbine of claim 3, wherein the second cable actuates rotation the second outboard blade to a desired swept angle relative to the second inboard blade and the third cable actuates rotation the third outboard blade to a desired swept angle relative to the third inboard blade.

5. The wind turbine of claim 1, wherein the first outboard blade and the second outboard blade are each biased toward a first position by spring loaded hinges.

6. The wind turbine of claim 5, wherein in the first position comprises a fully extended position at which the connected first inboard blade and first outboard blade and the connected second inboard blade and second outboard blade both have a maximum blade sweep, and wherein the first outboard blade has a swept angle of substantially 180° with respect to the first inboard blade, and the second outboard blade has a swept angle of substantially 180° with respect to the second inboard blade.

7. The wind turbine of claim 1, further comprising at least one extender cable that extends between the second outboard blade and the first inboard blade, and wherein the extender cable can be tightened or loosened to a desired tension by either a dedicated drive device or a gearbox of the wind turbine to rotate the second outboard blade to a desired swept angle relative to the second inboard blade.

8. The wind turbine of claim 7, wherein the desired swept angle corresponds to a fully extended position at which each connected inboard and outboard blade has a maximum blade sweep, and wherein the second outboard blade has a swept angle of substantially 180° with respect to the second inboard blade.

9. The wind turbine of claim 1, wherein the first cable connects to a winch inside the hub of the wind turbine, and wherein the first cable can be tightened or loosened to a desired tension by either a dedicated drive device or a gearbox of the wind turbine.

10. The wind turbine of claim 9, wherein the dedicated drive device comprises an electric motor.

11. The wind turbine of claim 1, wherein the first cable extends from the pulley underneath the skin of the second inboard blade into the hub of the wind turbine.

12. A blade assembly for a wind turbine, comprising:
   a hub;
   a plurality of inboard blades spaced apart from one another and mounted on the hub of the wind turbine;
   a plurality of outboard blades, each outboard blade pivotally connected to one of the plurality inboard blades; and
   a plurality of cables, each cable extending between one of the plurality of outboard blades and one of the plurality of inboard blades, and each cable connecting to a pulley disposed on or within each of the plurality of inboard blades.

13. The assembly of claim 12, wherein each of the plurality of cables actuates rotation of one of the plurality of outboard blades to a desired swept angle relative to the inboard blade to which it is pivotally connected.

14. The assembly of claim 13, wherein each of the plurality of cables connects to a winch inside the hub of the wind turbine, and wherein each of the plurality of cables can be tightened or loosened to a desired tension by either a dedicated drive device or a gearbox of the wind turbine to actuate rotation of one of the plurality of outboard blades to the desired swept angle.

15. The assembly of claim 14, wherein the dedicated drive device comprises an electric motor.

16. The wind turbine of claim 12, wherein each of the plurality of outboard blades is biased into a first position by spring loaded hinges.

17. The wind turbine of claim 12, wherein each of the outboard blades is connected to two or more inboard blades by two or more cables, and wherein one of the two or more cables are tightened or loosened to a desired tension by either a dedicated drive device or a gearbox of the wind turbine to rotate each outboard blade to a desired swept angle that corresponds to a fully extended position.

* * * * *